June 12, 1962 D. F. LINSLEY ET AL 3,038,311
VARIABLE SPEED UNIT
Filed Sept. 10, 1958 8 Sheets-Sheet 1
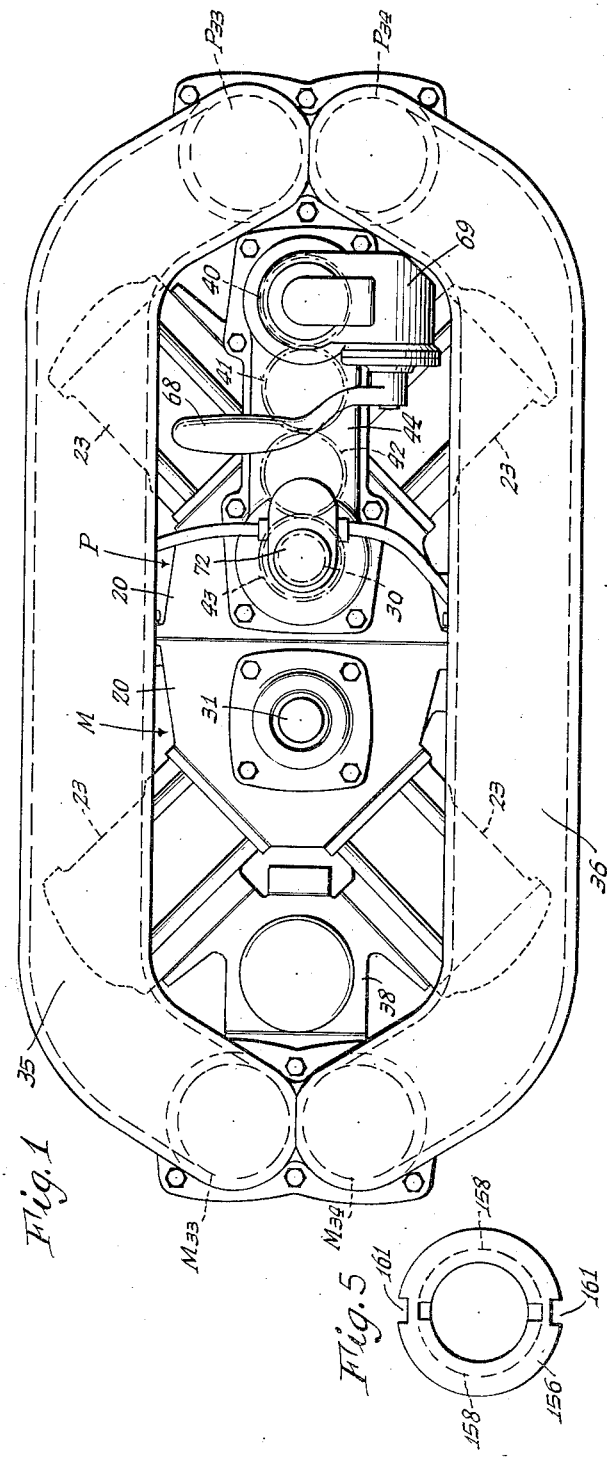
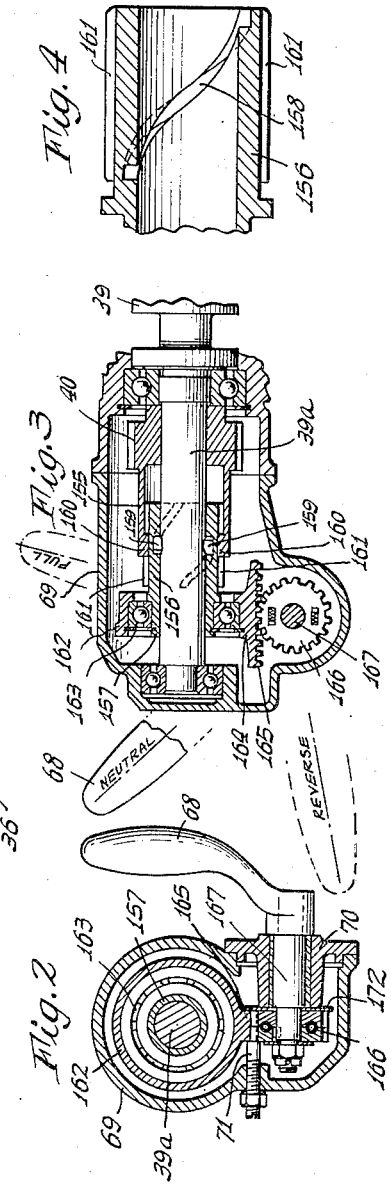
INVENTORS
Douglas F. Linsley
Harry J. Miller, Jr.
BY
Johnson and Kline
ATTORNEYS

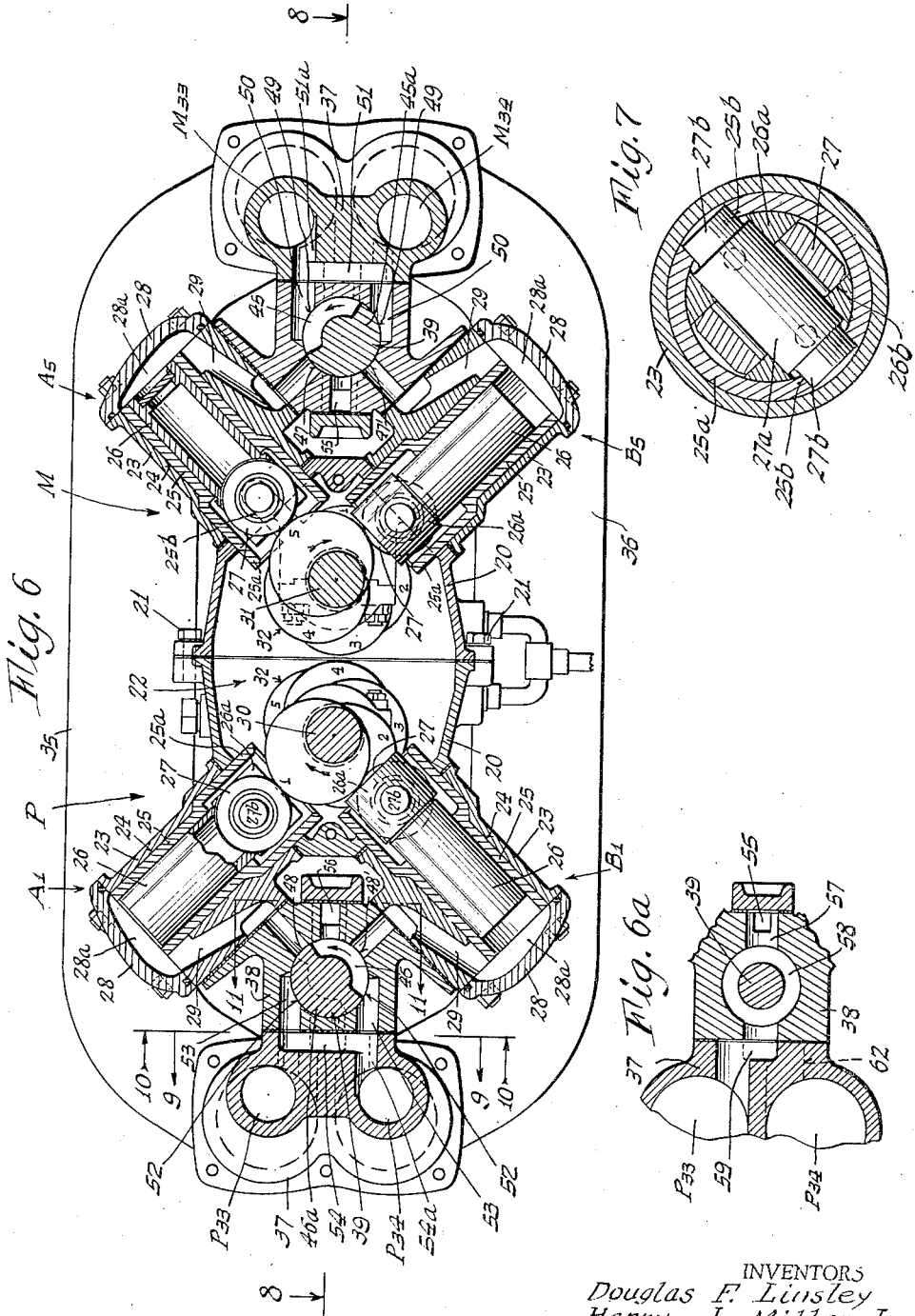

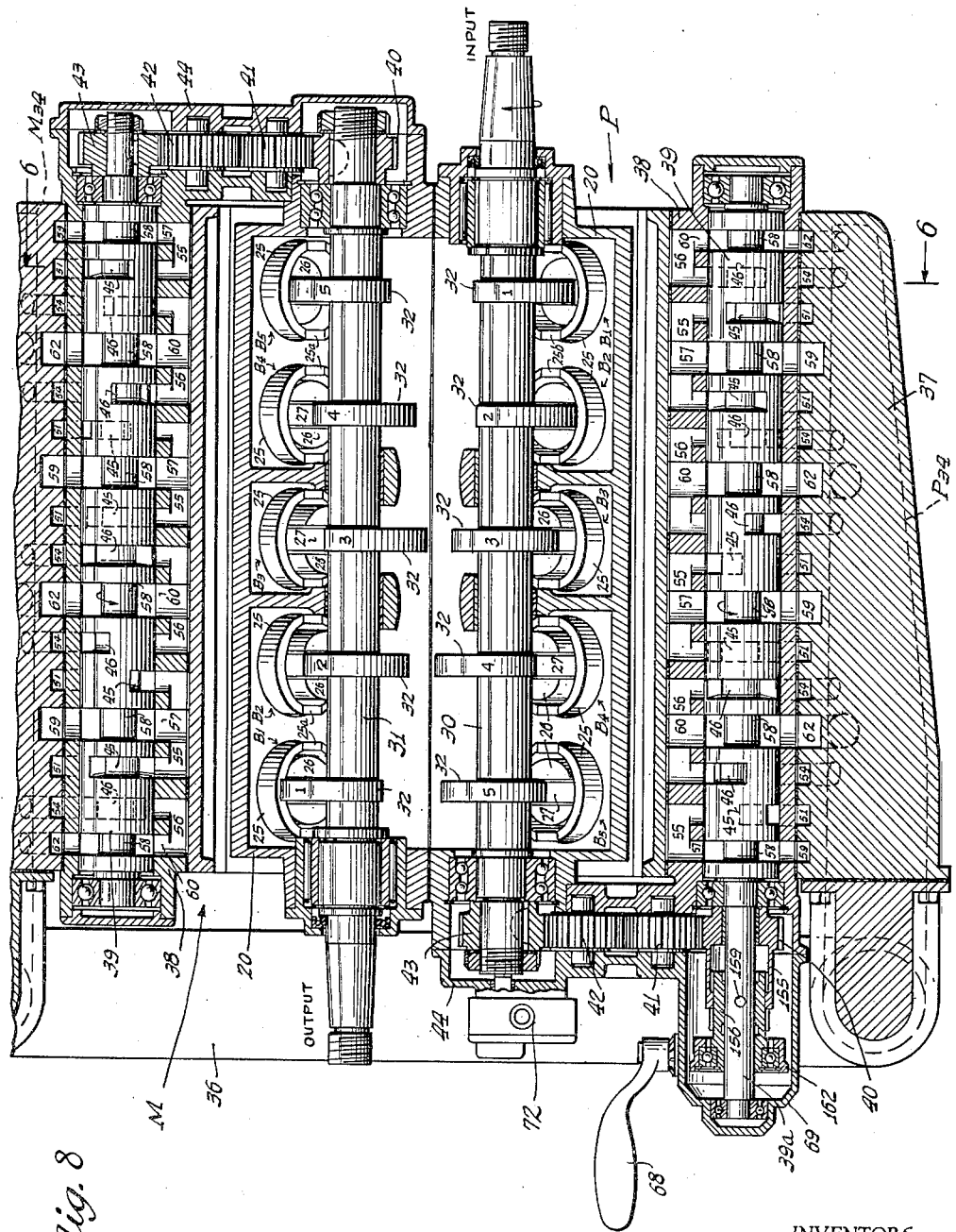

June 12, 1962 D. F. LINSLEY ET AL 3,038,311
VARIABLE SPEED UNIT
Filed Sept. 10, 1958 8 Sheets-Sheet 4
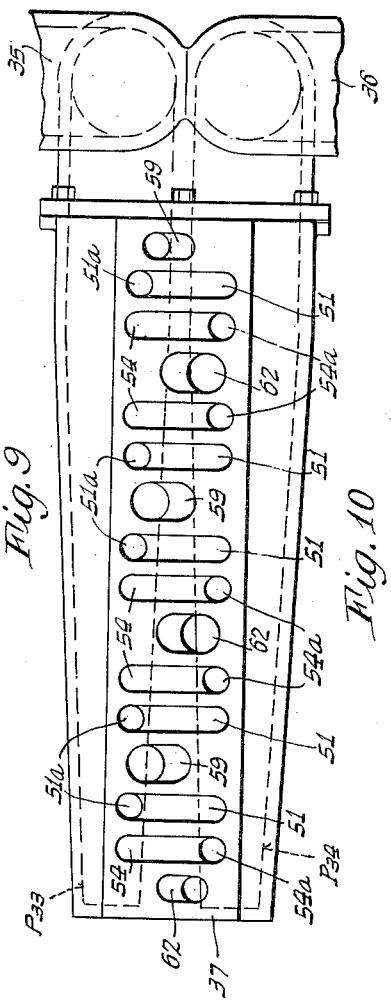
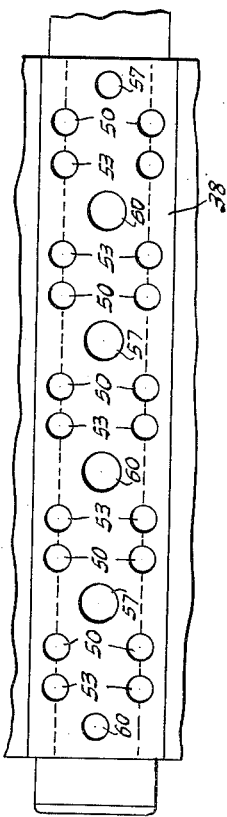
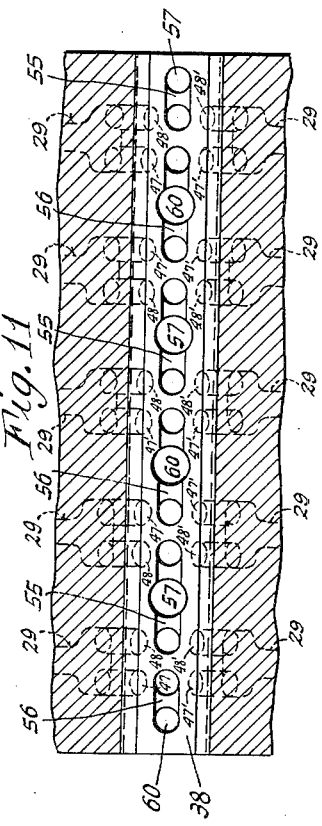
INVENTORS
Douglas F. Linsley
Harry J. Miller, Jr.
BY
Johnson and Kline
ATTORNEYS June 12, 1962 D. F. LINSLEY ET AL 3,038,311
VARIABLE SPEED UNIT
Filed Sept. 10, 1958 8 Sheets-Sheet 5
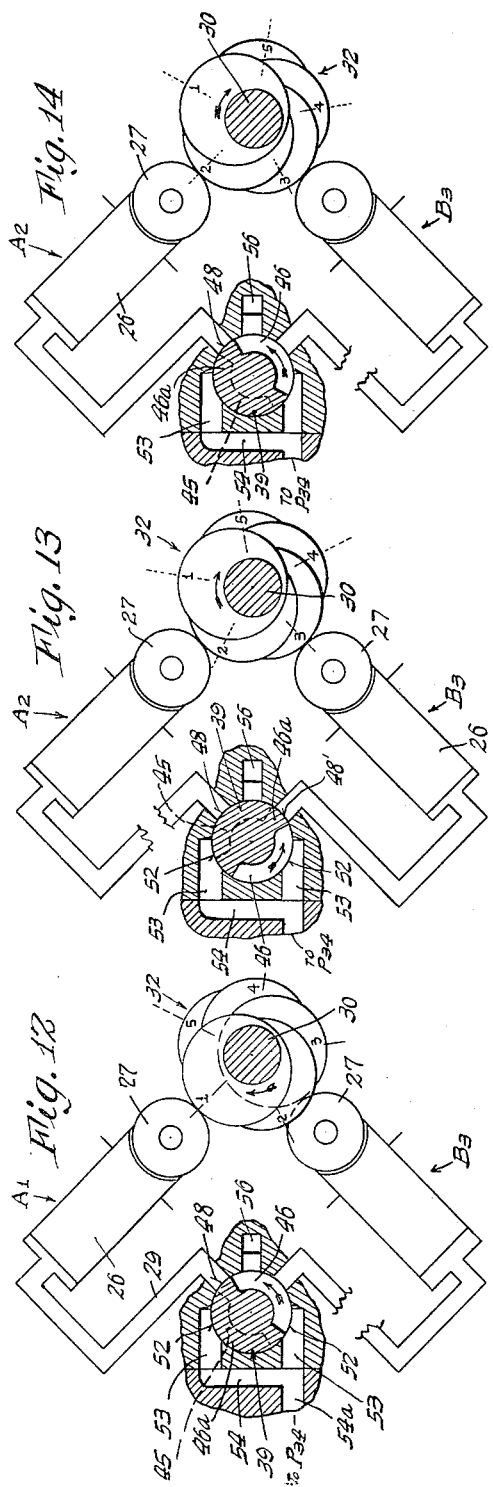
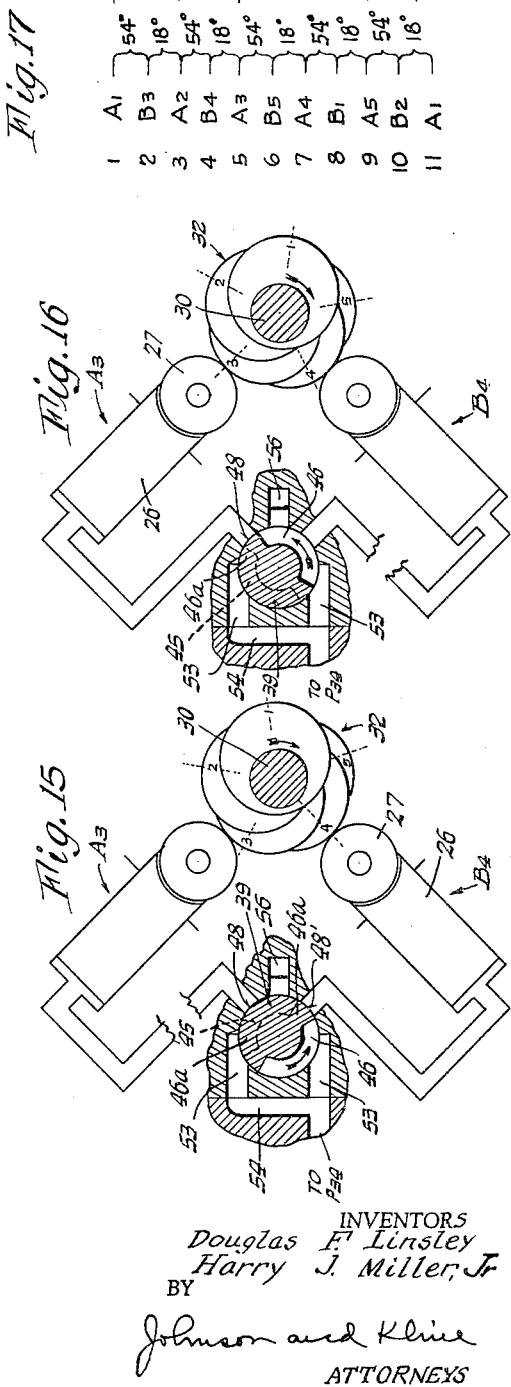
INVENTORS
Douglas F. Linsley
Harry J. Miller, Jr.
BY
Johnson and Kline
ATTORNEYS

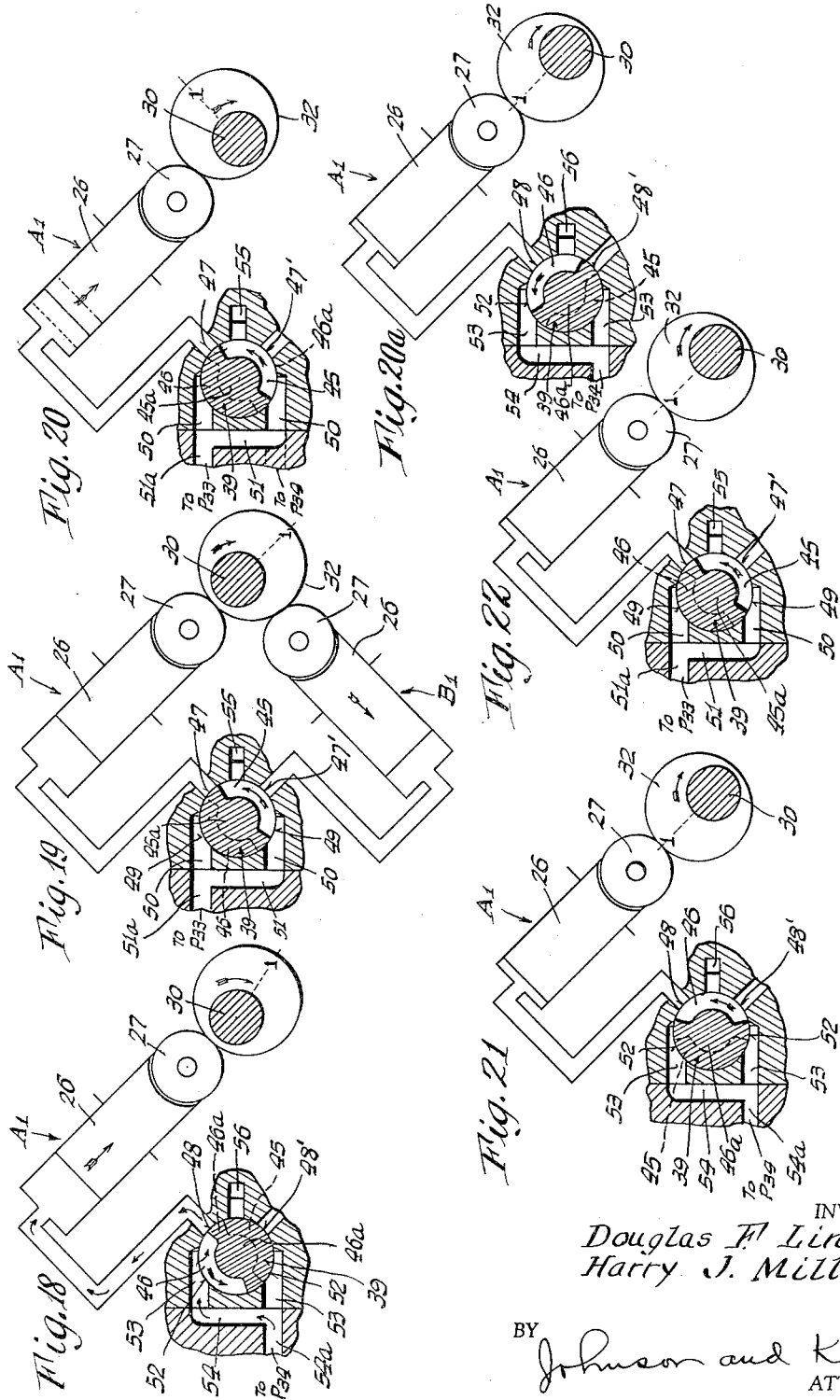

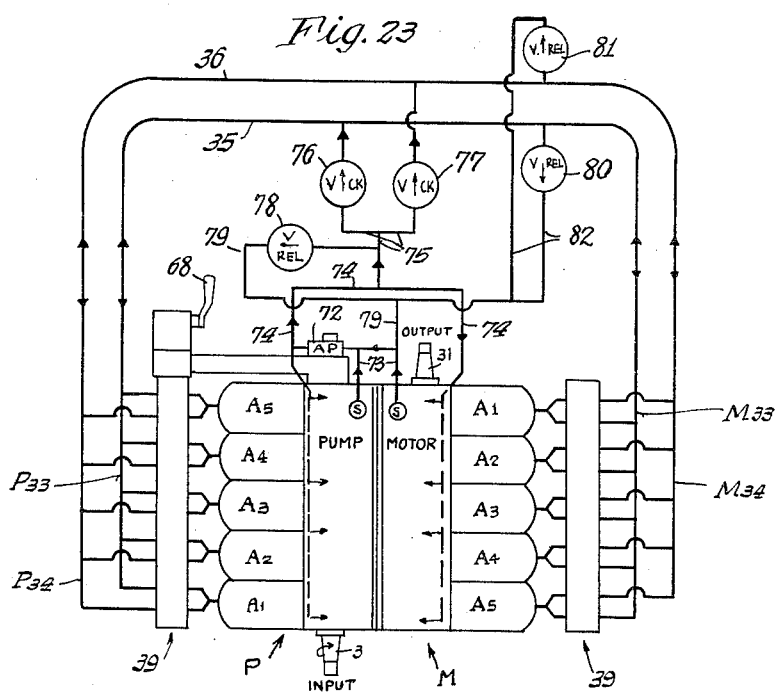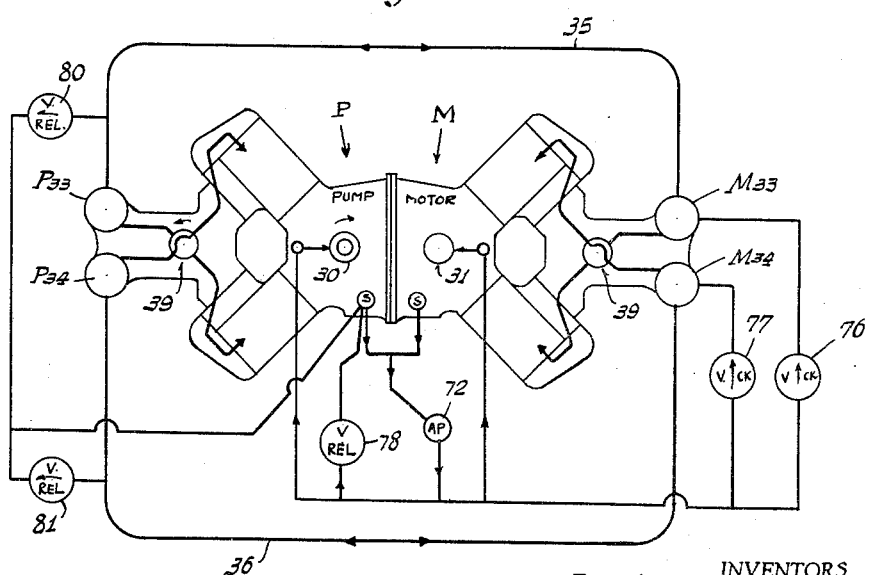

June 12, 1962    D. F. LINSLEY ET AL    3,038,311
VARIABLE SPEED UNIT
Filed Sept. 10, 1958    8 Sheets-Sheet 8

INVENTORS
Douglas F. Linsley
Harry J. Miller, Jr.
BY

Johnson and Kline
ATTORNEYS

United States Patent Office 3,038,311
Patented June 12, 1962

3,038,311
VARIABLE SPEED UNIT
Douglas F. Linsley, Westport, Conn., and Harry J. Miller, Jr., Jericho, N.Y., assignors to Morgan Development Laboratories, Inc., Westport, Conn., a corporation of Delaware
Filed Sept. 10, 1958, Ser. No. 760,259
18 Claims. (Cl. 60—53)

This invention relates to hydraulic variable speed devices.

An object of this invention is to provide a variable speed device including a piston and cylinder type fluid pump having a volumetric output which is variable without necessarily varying the speed applied to the pump.

Another object of this invention is to provide a hydraulic device which may have two structurally alike units, one unit serving as a pump while the other unit serves as a motor, each unit having cylinders and pistons and said units being interconnected so that the volumetric output of the pump unit which may be varied is effective to drive the motor at universally variable speeds from nil to maximum speed with substantially constant torque, whereby a driven member may be started and accelerated and decelerated and stopped at high efficiency.

Another object of this invention is to provide a positive displacement hydraulic pump and/or motor constructed and arranged so that fluid in variable quantities may be taken from one manifold and passed to another through the cylinders without the use of spring-operated valves between the cylinders and the manifolds.

Another object of the present invention is to provide a multicylinder pump and/or motor in which the sequence of operation of the pistons is such as to reduce to a minimum the pulsations usually attendant upon the operation of multicylinder devices.

Another object of this invention is to provide a pump and/or motor unit in which there are no fluid forces tending to move or resist movement of the valve means with the advantageous result that the valve means and the control means therefor may be shifted to a new phase setting with small physical effort, direct manual operation, for instance, thereby avoiding the need for supplying servo mechanism for the purpose.

Accordingly, the present invention in its preferred form provides a valve means which comprises a cylindrical valve body rotatably mounted in a valve housing for movement coordinately with the means for operating the pistons, the valve body having arcuate passages communicating at the proper time with ports in the valve housing which lead to the cylinders and to the manifolds.

Another object of this invention is to provide a variable speed device having parts which may be economically manufactured and easily assembled.

Another object of this invention is to provide a variable speed device which is compact and yet which is easily cooled. To this end, the motor and pump units each has a cylinder block with two banks of cylinders, one bank being angularly offset from the other and projecting from the frame so that when the frames of the units are bolted together they present an X arrangement, each bank of cylinders forming a leg of the X. Thus there is provided a large area of exterior surface from which heat developed in the device may be radiated.

To this end, a feature of the present invention is the provision of a multicylinder fluid displacement device having two banks of cylinders and pistons, the drivers for pistons of each bank being operatively equispaced by an angle which is the quotient of 360° divided by the number of cylinders, and the cylinders of one bank being angularly displaced by a number of degrees which is the quotient of 360° times five divided by twice the total number of cylinders. That is to say, according to the present invention, in a ten cylinder pump or motor where there are five cylinders in each bank, the cylinders in one bank are operatively offset from the cylinders of the other bank by 18°. It has been found, with this arrangement, that when one piston is approaching completion of its stroke at which time its output is at a minimum rate, another operatively adjacent cylinder is also approaching its full stroke and continues to displace fluid, thereby avoiding an abrupt interruption of the displacement at the peaks of the cylinder outputs.

Another feature of the present invention is the provision of a motor and pump type variable speed unit in which the valve means may be so adjusted with relation to the power input means which operates the valve means and pistons whereby the coordination of the opening and closing of the valves with the strokes of the pistons may be changed to vary the volume of the fluid output and the direction of flow without varying the speed or direction of the means for operating the pistons. For this purpose, in the form of the invention herein disclosed, there is provided control means in the said valve operating means whereby each cylinder may be connected to a first manifold and to a second manifold during the intake stroke and the discharge stroke respectively of its piston, or may be connected to the second manifold and to the first manifold during the intake and discharge strokes respectively of its piston, whereby the direction of fluid flow in the manifolds may be reversed without reversing the direction of operation of the means for operating the pistons. In either direction of flow, the control means may be adjusted so that the valve means connects each cylinder to each manifold alternately during a universally variable selected part of each stroke of its piston, whereby the volume of fluid output of the pump may be varied without varying the speed of the means for operating the pistons. When the control means is adjusted so that the selected parts of each stroke are equal, the fluid output of the pump is nil and the motor connected to the pump will be caused to stop.

Another object of this invention is to provide a fluid displacement device of the cylinder and piston type which is volumetrically variable even though the speed of operation and the length of the stroke of each piston is maintained constant. As a result, the device has a high volumetric efficiency since the strokes of the pistons are always the maximum for which the device is designed.

Other features and advantages will hereinafter appear.

In the accompanying drawings which illustrate one form of this invention, that at present preferred—

FIGURE 1 is an elevation of the variable speed unit of the present invention looking at it from the output end.

FIG. 2 is a transverse sectional view through the means for controlling the phase relation between the piston operating means and the valve means by which the output of the unit may be controlled.

FIG. 3 is a longitudinal section through the output control means, the operating lever being shown in neutral position, the full speed forward and full speed reverse positions being shown in dotted lines.

FIG. 4 is a longitudinal section through the sleeve by means of which the phase relation of the valve is adjusted.

FIG. 5 is an end view of the sleeve shown in FIG. 4.

FIG. 6 is a transverse section taken on the line 6—6 of FIG. 8 through the variable speed unit of the present invention.

FIG. 6a is a detail sectional view through the valve mechanism.

FIG. 7 is a transverse section through the lower end of the piston and cylinder showing the means for mounting the roller and for preventing the cylinder from rotating on its axis.

FIG. 8 is a horizontal section taken on the line 8—8 of FIG. 6.

FIG. 9 is a face view of the manifold body looking in the direction of the tailless arrows 9—9 of FIG. 6.

FIG. 10 is a face view of the valve body looking in the direction of the tailed arrows 10—10 of FIG. 6.

FIG. 11 is a vertical section taken on line 11—11 of FIG. 6.

FIGS. 12 to 16 are diagrammatic views showing the operating relations in the pump between the various piston cams and the pistons, and also showing the position of the cylindrical valve relative to one of the pistons shown when the unit is adjusted for full volume operation.

FIG. 17 is a chart showing the order in which the pistons of the various cylinders reach the peaks of their strokes and the angular movements of the cam shaft in the sequential operation of the pistons.

FIGS. 18 to 22 including FIG. 20a are diagrammatic views like FIGS. 12 to 16, FIG. 18 showing the position of the valve in the pump when the piston approaches the bottom of its stroke. FIG. 19 shows the position of the valve when the piston is beginning its return stroke. FIG. 20 and 20a shows the position of the valve when the unit is adjusted to neutral or nil output, the piston being shown midway between its inner and outer position in FIG. 20 and beginning its stroke in FIG. 20a. FIG. 21 shows the position of the valve when the valve is adjusted relative to the cam so as to produce approximately 75% of its maximum volume. FIG. 22 shows the position of the valve when the direction of flow of the fluid is to be reversed.

FIG. 23 is a diagrammatic view of the variable speed unit of the present invention looking from the top and showing the manifolds, the conduits between the two pairs of manifolds and the auxiliary pump and sump.

FIG. 24 is a view like FIG. 23, but showing the paths of the fluid between the manifolds and the cylinders.

Figure 25:
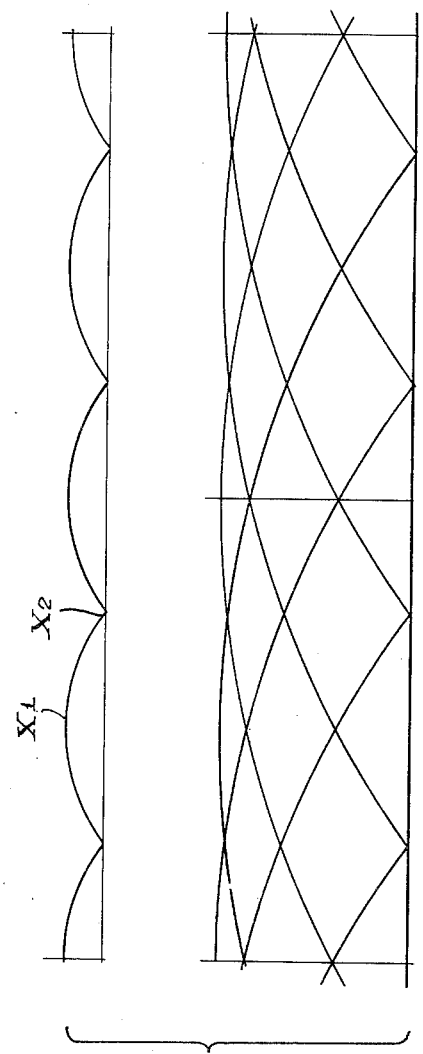

FIG. 25 is a graph showing the flow of fluid from a ten cylinder pump in which the pistons are operatively displaced 36°, and a resultant curve showing the total fluid flow characteristics of five of the cylinders whose pistons are on their discharging strokes.

Figure 26:
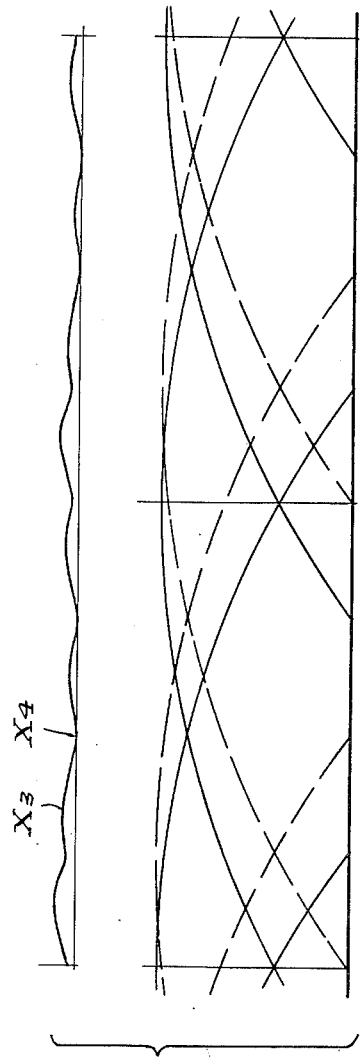

FIG. 26 is like FIG. 25 but shows graphs of the flow of fluid according to one embodiment of the present invention in which there are two groups of five cylinders having the pistons operatively displaced 18°, and a resultant curve showing the total flow characteristics of five of the cylinders whose pistons are on their discharging strokes.

The variable speed device of the present invention includes two units—a pump unit P and a motor unit M—secured together to form a unitary structure. These units may be substantially alike, but in the broader aspects of the invention a motor unit of different construction can be substituted for the one illustrated and described herein.

Each unit comprises a frame 20 which is open on one side and the marginal edges of the open sides of the frames engage and are secured together by bolts 21 and form between them a case 22.

Since the pump unit P and the motor unit M are substantially alike, the description of one will for the most part apply to the other and like reference numerals indicate corresponding parts in both.

Referring to FIG. 6, the pump unit has cylinder blocks 23 having a plurality of cylinders 24, there being in the form shown a plurality of cylinders 24 arranged in one row and an equal number of cylinders 24 arranged in another row, the rows of cylinders diverging in opposite directions from the frame 20 and forming between them an angle of approximately 90° for an important reason which will be explained below.

Within each cylinder 24 there is a cylinder liner 25 which carries for reciprocation therein a piston 26 at the inner end of which there is mounted a roller 27 by which motion is transmitted to and from the piston.

The cylinder block 23 has a head 28 for each row of cylinders and each cylinder has a duct 29 through which fluid may pass to and from a cavity 28a formed in the head 28 over each piston.

There are five cylinders 24 in one row and these are marked for reference A1, A2, A3, A4 and A5. There are also five cylinders 24 in the second row, each being directly below a cylinder in the other row. The cylinders 24 in the lower row are numbered for reference B1, B2, B3, B4 and B5.

One of the features of this invention is the provision of pump and motor units which are for the most part alike and thereby substantially reducing the cost of producing the variable speed device. When advantage is taken of this feature, it will be apparent from FIG. 8, it is merely a matter in assembling the device of rotating one unit in a horizontal plane 180° relative to the other. Thus, as shown in FIG. 8, the cylinders B1, B2, etc. progress from the left while in the pump unit they progress from the right. Since the section shown in FIG. 6 is taken on the line 6—6 of FIG. 8 in the direction of the arrows, the pump cylinders A1 and B1 are shown while in the motor unit the cylinders A5 and B5 appear.

Within the casing 22 and supported by bearings in the frames 20 are power transmitting shafts 30 and 31, the former for the pump and the latter for the motor. On each shaft there are provided five approximately circular cams 32, each being positioned to cooperate with the roller 27 of a piston arranged in the upper row, and also a companion piston arranged in the lower row as the shafts 30 and/or 31 rotate. The cams 32 are marked for reference 1, 2, 3, 4 and 5—it being understood that the cam 1 cooperates with cylinders A1 and B1, and the cam 2 cooperates with the cylinders A2 and B2, etc.

In the case of the pump P, the cams 32 operate the pistons during their outward or fluid displacing strokes while in the motor the pistons operate the cams during their inner stroke to transfer motion to the shaft 31 when the variable speed device is operating normally with power being supplied to operate the shaft 30 of the pump from a prime mover or other source. Should the operating power be applied to the motor shaft 31, the action of the unit would be reversed causing the unit M to become a pump and the unit P to become the motor. To avoid confusion and for the purpose of description the shaft 30 will be referred to as the power input means and the shaft 31 will be referred to as the power output means. The cylinders of the pump are filled with fluid under pressure during their inner strokes as will be explained below.

The serious problem in the design and manufacture of hydraulic variable speed units has been the inability to obtain a substantially pulseless output of power, particularly in a device in which the power output is variable over the full range from nil to maximum. This is because unless an inordinate number of cylinders and pistons are used (which would increase the over-all size of the device without increasing the power factor) there have been unavoidable dips in the power curve, resulting in an irregular, pulsating power output.

This difficulty has been overcome, for all practical purposes, by the present invention by the discovery that if a set of five cylinders and pistons operated by a prime mover and cyclically equispaced is operationally offset 18° from a like set of five cylinders and pistons, the output curve is a substantially straight line, and that this is true regardless of variations in the length of strokes of the pistons and the value of the power output.

To be more specific, by the present invention it has been discovered that pulsations in fluid flow and hence power output can be substantially reduced when a ten cylinder pump is constructed and arranged so that when a piston in one set or bank of cylinders reaches its peak, the pistons in the other bank which operationally lead or lag that piston do so by 18° and 54° respectively. Thus, in each 72° of revolution of the cam shaft 31 and the cams 32 the high points of two related cams will have reached the rollers of the pistons with which they cooperate.

In the disclosed embodiment of the invention, this result is accomplished by displacing one bank of cylinders and pistons relative to the other bank not 72° as would be dictated by ordinary practice for five cylinders and two banks, but 18° more than 72°, namely 90°, thus accomplishing the 18° operational offset of the pistons above referred to.

The effect of this arrangement is that when two pistons are approaching the tops of their strokes at which time the displacement per unit of cam movement is reduced in volume, the closely following piston will add to the total displacement and thus compensate for the reduction.

Reference is made to the graph, FIG. 25, in which there is shown by way of example the rate of volume output of equispaced cylinders of a ten cylinder pump along with the curve showing the fluctuation in the rate of flow resulting from the operation of such a pump. From this it will be seen that there are regular peaks X1 and valleys X2 of determinate amplitude.

In FIG. 26 which is a graph showing the output of the ten cylinder pump made according to the present invention wherein five pistons are operatively offset 18° from the other five, it will be seen that the output curve is substantially flattened, the amplitude of the peaks X3 and valleys X4 being so much less than that shown in FIG. 25 that the curve is substantially a straight line.

In order that the operation of the motor and pump of the present invention may be more fully understood, attention is called to FIGS. 12 to 16 which diagrammatically show the sequence of operation of the pistons and their cams. Attention is also called to the chart, FIG. 17, showing the functional order of the various pistons.

In FIG. 12 the cam 1 is shown in position engaging the roller 27 for the piston of cylinder A1 with the piston 26 at the top of the stroke. Since the cams rotate clockwise, further movement of cam 1 will cause the piston to start its intake stroke. In FIG. 12, the cam 3 has its high point 54° from and approaching the roller 27 for the piston of cylinder B3, and this is the next piston to operate. After the shaft 30 has rotated 54°, the high point of the cam 3 will engage the roller for the piston of cylinder B3 as shown in FIG. 13, the piston having reached the end of its discharge stroke. FIG. 13 also shows that the high point of the cam 2 has not quite reached the roller 27 of the piston of cylinder A2 but is offset 18°. Therefore even though no more fluid is being displaced from the cylinder B3, fluid continues to be displaced from the cylinder A2.

This condition continues until cam 2 reaches the position shown in FIG. 14 where the piston of cylinder A2 has reached the peak of its stroke, the piston of cylinder B3 receding and being on its intake stroke. Cam 4 is shown in the position it then occupies which is 54° removed from the axis of its cylinder B4. After the cam shaft 30 rotates 54°, the cams take the position shown in FIG. 15 in which the cam 4 now has its high point engaging the roller of the piston of cylinder B4, while the cam 3 has its high point falling 18° short of the roller of the piston of cylinder A3. After the next 18° of movement of the shaft 30, the cam 3 has its high point engaging the roller of the piston of cylinder A3 (see FIG. 16). The high point of the cam 5 is 54° removed from the axis of the roller of its cooperating cylinder B5. The sequence continues in this way as indicated on the chart, FIG. 17, the high points of the cams 4, 1, 5, 2 engaging successively the rollers of the pistons in the cylinders A4, B1, A5 and B2 to the position shown in FIG. 12 where high point of cam 1 engages the roller of the piston of cylinder A1.

It will be understood from the above that in every instance during 72° of movement of the shafts 30 and 31, two companion cylinders complete a cycle of operation to the peaks of their discharge strokes, one cylinder operatively displaced 18° from the other.

It will thus be seen that it has been found, according to the present invention, that in a ten cylinder pump or motor with two banks of five cylinders offset 90° from each other, pulsations in the fluid flow can be minimized by causing the pistons of the second set of alternately operating pistons to reach the peaks of their discharge strokes after 18° of movement of the piston operating shaft following the pistons of the first set respectively reaching the peaks of their discharge strokes.

This principle however is not limited to a ten cylinder pump or motor. It has been found that the degree of operational lag or lead, depending on the starting point of one set of cylinders relative to the other and the angle of the V arrangement, can be determined for any even number of total cylinders in excess of four from the following formula:

$$X = \frac{180°}{N}$$

in which X is the angle of lag (or lead) and N is the number of total cylinders.

Applying this formula to a ten cylinder unit, it will be seen that the angle of lag or lead is 18°. Applying it to a twelve cylinder unit the angle would be 15°, and to a fourteen cylinder unit the angle would be about 12.85°. If the hydraulic pump and/or motor is composed of two in-line banks of cylinders arranged in more or less V shape, in order to incorporate the proper degrees of lead or lag as X above, the angle of the V-formation may be determined by the following formula:

$$Y \text{ (angle of V arrangement)} = \frac{5 \times 360°}{2 \times \text{number of pistons}}$$

where "5" is a factor which has been arrived at empirically. This formula can be simplified to read $$Y = \frac{900}{N \text{ (number of pistons)}}$$

Thus, in an eight cylinder unit the lead or lag would be 22.5° and the angular offset between the banks would be 112.5°. In a ten cylinder unit, the lag would be 18° and the angular offset would be 90°. In a twelve cylinder unit the lag would be 15° and the angular displacement would be 75°. In a fourteen cylinder unit the lag would be approximately 12.85° and the angular displacement approximately 64.28° and so on.

As will be seen from an examination of FIG. 17, that the order in which the pistons reach the peaks of their discharge strokes does not proceed from a cylinder in one bank to an adjacent cylinder in the next bank. For instance, in the example given, the pistons of the cylinders A1, A2, A3, A4 and A5 follow by 18° the pistons of the cylinders B2, B3, B4, B5 and B1 respectively, the latter being operationally 72° apart.

The pump unit P includes a first manifold P33 and a second manifold P34, and the motor unit M includes a first manifold M33 and a second manifold M34, and as shown in FIG. 1 and diagrammatically in FIGS. 23 and 24, the manifolds P33 and M33 and manifolds P34 and M34 are interconnected by conduits 35 and 36 respectively. Either of these pairs of manifolds P33 and M33, and P34 and M34 and their respective conduits 35 and 36 may constitute supply manifolds or delivery manifolds, since as will appear below the system is reversible.

To facilitate the description of the units, it will be assumed that at the moment the manifolds P33 and M33 are delivery manifolds and that the manifolds P34 and M34 are supply manifolds, and the description will be directed to the pump unit, but it will also apply to the motor unit.

As shown in FIG. 6, the manifolds P33 and P34 are formed in a block 37 which is secured to another block 38 which in turn is secured to the cylinder blocks 23 and it is through the blocks 37 and 38 that communication between the cylinder ducts 29 and the manifolds is established under control of valve means which is housed in the block 38. The valve means comprises a valve cylinder 39 which is rotated by and coordinately with the shaft 30 through gears 40, 41, 42 and 43, see FIG. 8, located in a gear housing 44, the gear 43 being driven by the power input shaft 30 carrying the cams 32 while the gear 40 drives the valve cylinder 39, the arrangement being such that the latter has the same angular speed as the drive shaft 30 but rotates in the opposite direction.

As shown in FIGS. 6 and 8, the valve cylinder 39 has a series of five arcuate passages 45 each of which extend approximately 132° around the periphery of the valve, one passage 45 being provided for each vertical pair of cylinders A1 and B1 for instance. Each passage 45 has a companion passage 46 also for the same pair of cylinders. The arcuate passages 45 and 46 are angularly displaced 180°.

The passages 45 and 46 respectively may alternately communicate with ports 47 and 47' for the "A" group of cylinders, and 48, 48' for the "B" group (see FIG. 11) which through ducts 47a and 48a respectively connect with the duct 29 for each cylinder.

The passages 45 and 46 also communicate with the manifolds P33 and P34 respectively so that the fluid may be drawn into the cylinders from one of the manifolds and be discharged from the cylinders into the other manifold depending on the rotative position of the valve and its passages, the solid parts 45a and 46a closing their respective ports 47, 47', 48, 48' when no fluid flow is to take place therein.

Each passage 45 also aligns with a pair of ports 49 in the valve housing 38 communicating with ducts 50 which align with an interconnecting duct 51 in the manifold body 37, the duct 51 having an extension 51a leading into the manifold P33.

Each passage 46 likewise aligns with a pair of ports 52 in the valve body communicating with ducts 53 which align with an interconnecting duct 54 in the manifold body 37, the ducts 54 having an extension 54a leading into the manifold P34.

In order that the passages 45 and 46 may remain connected to their manifolds in all rotating positions of the valve body 38, the valve housing 38 is provided with elongated channels 55 and 56 respectively, see FIGS. 6a and 11, located midway between the ports 47 and 48 and aligning with adjacent passage 45 and 46 respectively. Each channel 55 has a duct 57 also opening into the valve chamber and this duct is located opposite a full annular passage 58 in the valve. Opposite the annular groove 58 there is a port and passage 59 leading into the manifold P33. Thus it will be understood that the channel 55 is constantly connected to the manifold P33 and will contain fluid, either supply or fluid under pressure, depending on whether the pump is operating in forward or in reverse.

Each channel 56 likewise has a duct 60 communicating with a full annular passage 61 in the valve body which in turn has a port and a duct 62 connecting with the manifold P34. Thus it will be understood that the channels 56 are constantly connected to the manifold P34 and for all practical purposes form extensions of the ports 49 and ducts 50.

Each vertical pair of cylinders, cylinders A1 and B1 for instance, has associated with it a passage 45 and a passage 46 in the valve body 39. As shown in FIG. 8, the passages 45 and 46 for each successive pair of cylinders across the rows are along a helical line and spaced 72° from the adjacent pair, in the case of the ten cylinder pump shown.

To explain the operation of the valve mechanisms for the pump, it will be assumed that the pump is operating at full output, that the manifold P34 is the supply manifold and that the piston for the pump unit cylinder A1 is in the position shown in FIGS. 6 and 12 where it is just about to start its intake stroke. As soon as the valve is moved counterclockwise from the position shown, the passage 46 connects with the port 48 leading to the cylinder A1 and fluid begins to flow into the cylinder from the supply manifold P34 through the supply ducts to the ports 52 and 60 which are open to the passage 46.

Bearing in mind that the passage 46 in the valve is always in communication with the manifold P34, the flow of fluid to the cylinder will continue until the piston approaches the bottom of its stroke when, as shown in FIG. 18, the solid part 46a is about to complete the closing of the port 48.

When the piston reaches the bottom of its stroke the solid part 46a closes the port 48 and at the same time the solid part 45a has moved to position where it is about to uncover the port 47 as shown in FIG. 19, and when the valve moves further the passage 45 which is constantly in communication with the manifold P33 will move across the port 47 and allow the fluid to be discharged from the cylinder during its up-stroke.

While the valve is rotating counterclockwise from the position shown in FIG. 6, the passage 46 which had previously opened the port 48' of cylinder B1 continues to allow fluid flow to cylinder B1 until the solid part 46a covers the port 48'. During this time the solid part 45a maintains the port 47 closed until the piston of cylinder A1 reaches the peak of its stroke as shown in the motor unit at the right in FIG. 6.

Referring to FIG. 19, the passage 45 will continue, as the valve moves, to connect the port 47' of the cylinder B1 to the discharge manifold P33 until the solid part 45a covers the port 47'.

Referring to FIG. 13, it will be seen that the solid part 46a is about to move off the port 48' of the cylinder B3 and thus connect the cylinder B3 to the supply manifold P34.

Referring to FIG. 14, the solid part 46a is about to uncover the port 48 leading to the cylinder A2; in FIG. 15, the solid part 46a is about to uncover the port 48' of cylinder B4; and in FIG. 16 the solid part 46a is about to uncover the port 48 of the cylinder A3—in each case connecting the cylinder to the supply manifold P34.

These operations proceed seriatim so long as the phase relation of the valve 39 and the cam shaft 31 remains unchanged and maximum output is required of the pump.

Because of the fact that the same cam 32 operates on companion cylinders in the two banks, i.e., on an A group cylinder and an adjacent B group cylinder, and because the banks are angularly offset 90°, the valve operation of opening and closing the ports 47 and 47' and 48 and 48' does not proceed seriatim from one cylinder in one bank to a companion cylinder in the other bank.

With the high points of the cams and the valve passages arranged in a helical pattern as shown, the sequential order in which the pistons reach the top of their discharge strokes will be understood by reference to FIGS. 12 to 17 and the description above regarding the same.

In order to vary the output of the pump and the direction of flow of the fluid output thereof, the present invention provides means for universally changing the phase or timing of the valve mechanism with relation to the cam shaft for the pistons. In the broader aspects of this invention, this may be accomplished by any suitable means which is capable of advancing and retracting the cylindrical valve body 39 angularly with relation to the cam shaft 31. Preferably, this may be done by altering the train of connections between the cam shaft and the valve.

In the form of the invention herein illustrated and described, this is accomplished by mounting the gear 40 for rotary movement on the shaft 39a for the valve body 39 and coupling the gear 40 and the shaft 39a by a variable connection through which the gear 40 may be angularly advanced in the direction of rotation of the valve shaft 39a or retracted relative thereto.

For this purpose, the gear 40 is provided with a sleeve 155 having a telescopic connection with a sleeve 156 mounted on a collar 157 and slidably mounted on the shaft 39a.

The sleeve 156 has a pair of helical grooves 158 into which extend pins 159 carried by the shaft 39a. The sleeve 155 has splines 160 located in longitudinal grooves 161 in the sleeve 156 whereby the latter is coupled to the gear 40 for rotation therewith. Thus it will be seen that by moving the sleeve 156 and its collar 157 axially, the angular relation between the shaft 39a and the gear 40 will be changed to retract or advance the shaft 39a and the valve body 39 relative to the gear 40 and hence relative to the power input shaft 30.

In the form of the invention herein disclosed, in order to shift the collar 157 axially and yet permit it to rotate with the shaft after the adjustment has been made, the collar 157 is coupled to a ring 162 by ball bearings 163. The ring 162 has an arm 164 provided with a gear rack 165 which meshes with a lost motion take-up gear 166 on a shaft 167 connected to a handle or lever 68.

Thus, by rotating the handle in one direction or another, the collar 157 can be shifted axially to advance or retract the shaft 39a angularly relative to the gear 40.

The control mechanism above described is enclosed in a housing 69 which may be attached to the casing 20 or the gear housing 44. The housing 69 has a bearing 70 for the control lever shaft 167. To prevent the sleeve 162 from rotating, the arm 164 is engaged on one side by an adjustable stop pin 71 and on the other side by a flange 172 abutting against the bearing 70.

When the output of the pump is to be nil, in the form of the invention herein disclosed, the valving mechanism is so arranged that by adjustment of the lever 68 to the neutral vertical position shown in FIGS. 1 and 3, each cylinder is connected to the supply manifold for one half of each stroke and to the discharge manifold during the other half of each stroke. For instance, when no output is required of the pump, i.e. the pump is operating at neutral, the cylinder may be connected to the supply manifold during the first half of the intake stroke of its piston and to the discharge manifold during the second half of the intake stroke, and then during the first half of the discharge stroke of its piston the cylinder would be connected to the discharge manifold to return to it the volume of fluid it had just taken, and during the second half of its discharge stroke it would be connected to the supply manifold to return to it the volume it had previously taken. The result of the operation of the piston in its intake and discharge strokes is that no flow of fluid takes place from the pump to the motor, the intakes and discharges of each cylinder and the several cylinders balancing out each other.

This condition is illustrated in FIG. 20 from which it will be seen that the valve body 39 is in such position that the solid parts 45a and 46a cut off the flow between the manifolds P33 and P34 with which they communicate midway in the strokes of the piston.

Shifting the valve body, i.e. clockwise, relative to the input shaft 30 from the neutral position will gradually change the point in the travel of each piston at which its cylinder is disconnected from one manifold and connected to the other. For instance, if the valve body 39 is shifted in a clockwise direction 45° from that which it occupies at the nil or neutral position as shown in FIG. 20a (or is shifted counterclockwise 45° from the full power position shown in FIG. 12 so that it occupies the position shown in FIG. 21), the cylinder will be connected to the supply manifold for approximately three quarters of the intake stroke of its piston and for the balance (one quarter) of its intake stroke it will be connected to the discharge manifold. On the discharge stroke of the piston, the cylinder will be connected to the discharge manifold for three quarters of the discharge stroke and will be connected to the supply manifold for the remainder (one quarter) of that stroke. The result will be that the output flow of the pump will be between the maximum output and the nil output approximately 75% of the volume with the cam shaped about as shown. The percentage may be varied by changing the shape of the piston operating cam.

It will be understood, of course, that in any adjusted positions of the cam body between neutral and maximum speed output positions, any desired variable output of the pump between maximum and nil may be obtained.

According to the present invention, the direction of flow of fluid through the manifolds may be reversed with the result that the motor unit connected to the pump unit may have its direction of operation reversed.

This may be accomplished very simply and expeditiously according to the present invention by further shifting the valve body 39 counterclockwise with relation to the cam shaft 30 from neutral position which has the effect of causing the flow of fluid to proceed from the erstwhile discharge manifold to the cylinder and then to discharge into what was the intake manifold. If the full output is required in reverse, the valve body 39 is shifted counterclockwise by operation of the lever 68, 90° from the neutral position, i.e. 180° from the full output forward position, the position of the valve body under these conditions being illustrated in FIG. 22.

From this view it will be observed that during the intake stroke of the piston of cylinder A1, the passage 45 will connect to the cylinder ports 47 and 47' as shown in FIG. 22 which lead to the manifold P33 which thus becomes the supply manifold while the passage 46 connects to the cylinder ports 48, 48' which lead to the manifold P34 which then becomes the discharge manifold, and thus the direction of flow from the pump to the motor is reversed resulting in the reversal of drive of the motor.

It will be understood, of course, that the valve body may be adjusted universally between the neutral or nil position and the full reverse position, the operation being the same as between neutral and full forward positions but in reverse direction.

As stated above, the motor unit may be and preferably is a substantial duplicate of the pump unit, being interconnected by the conduits 35 and 36 joining the manifolds P33 and M33 and P34 and M34. Assuming for the purpose of explanation that the manifold P33 is the pressure or discharge manifold, it will be readily understood that the fluid flow to the motor from the pump will operate on the pistons of the motor when the manifold M33 is connected to the motor cylinders by the valve body 39 and cause the rollers 27 at the ends of the pistons to operate upon the cams 32 and cause rotation of the output shaft 31.

During the outward strokes of the pistons of the motor unit, the fluid passes through the valve 39 to the manifold M34 and thus back to the pump manifold P34 through the conduits 36.

When the pump is operating at full output flow (for full speed), the full volume will be conveyed to the motor with the result that the motor will operate at substantially the same speed as the pump.

When it is desired to reduce the speed of the motor, the control lever 68 is operated to retract the valve mechanism 39 of the pump as explained above to reduce the output volume of fluid flowing from the pump, with the result that the pistons of the motor will operate more slowly and the speed of the output shaft of the motor will be reduced, notwithstanding that the speed of the input shaft of the pump remains constant. When the control lever and valve body 39 are adjusted to the neutral position, there being no flow of fluid between the pump and the motor, the motor will cease to operate and the motor shaft will become stationary.

Upon the control lever 68 and the valve mechanism being further retracted, the direction of flow through the manifolds M33 and manifolds M34 will be reversed, with the result that the direction of operation of the motor and the output shaft 31 therefor will be reversed.

The speed of the input shaft 30 need not be constant but may be varied by the variation in the speed of the prime mover which operates it, but it will be understood, of course, that should the speed of the input shaft be varied, the speed of the output shaft will be varied and the proportion will depend upon the adjustment of the valve mechanism of the pump.

It will be noted that the valving of the pump is accomplished, according to the present invention, without the use of poppet valves or other spring-operated valves. In addition, as will presently be explained, the arrangement is such, according to the present invention, that the pistons during their intake strokes are not operated by springs.

To accomplish this, the present invention provides for maintaining sufficient pressure in the manifolds to cause each piston to be forced inwardly during its intake stroke so that its roller 27 maintains constant contact with its cam 32. To accomplish this, the present invention provides on the input shaft 30 of the pump, which it will be understood may be operated by a prime mover, an auxiliary pump 72, see FIGS. 8, 23 and 24, which may be in the form of a gear pump mounted on the gear case 44.

As diagrammatically illustrated in FIGS. 23 and 24, the auxiliary pump 72 has its intake side connected by conduits 73 to the bottom of the cam case 22 which acts as a reservoir for the oil used as the fluid on which the pump operates and by which it is lubricated.

The auxiliary pump 72 has conduits 74 leading to the cam shaft bearings and other parts of the pump and motor units for lubricating purposes. It also has conduits 75 leading to pressure responsive one-way valves 76 and 77 connected respectively to the conduits 35 and 36 of the manifolds P33 and M33 and P34 and M34. The valves 76 and 77 are set to permit flow of oil to either manifold before the pressure therein falls below a certain value, which value is sufficient to cause the rollers 27 of the pistons in both the pump and the motor units to remain in firm engagement with the cams 32, and since they lead to both manifolds this will be true regardless of the direction of flow of the fluid through the manifolds.

The conduits 75 also connect to a relief valve 78 connected by conduits 79 to the sump in the casing 22 and is set so that excess output of the auxiliary pump 72 may be returned to the sump. The manifold conduits 35 and 36 are also connected by relief valves 80 and 81 respectively and these are connected to the sump of the casing 22 by conduits 82 and are so set as to permit excess oil in the manifolds to return to the sump should the pressure in the manifolds respectively exceed a predetermined value.

Since the pressure responsive valves 76, 77, 78, 80 and 81 are automatic in their operation, the variable speed unit of the present invention is always ready without manual adjustment of the valves to cause the flow of fluid to be in one direction or the other and to permit the pump unit to operate as a motor and the motor unit to operate as a pump, which situations would exist if the output shaft of the unit is connected to a vehicle or other device having momentum and the input shaft be decelerated as when the power from the prime mover is interrupted or reduced or the momentum of the vehicle causes it to exceed the speed called for by the adjustment of the speed control lever 68.

It should be noted that the manifolds P33 and M33 and P34 and M34 along with the sump of the motor casing 22 and the pressure responsive valves above referred to and the piping thereto form a closed system for the fluid used in the operation and lubrication of the variable speed device and that the sump of the casing 22 constitutes a reservoir to which fresh fluid may be added through a suitable filler opening in the casing 22 to replenish any losses.

When the valve mechanism is arranged as illustrated herein, in the indicated "forward" position of the control lever 68, the output shaft 31 of the motor will operate at the same speed and in the same direction as the input shaft 30 of the pump, and this is advantageous when the prime mover and the machinery or vehicle operated are both to rotate in the same clockwise direction.

If, however, it is desired or necessary that the machinery to be operated moves in a counterclockwise direction while the prime mover moves forwardly in a clockwise direction, no mechanical changes need be made in the variable speed unit of the present invention. It will merely be necessary to reverse the indicator for the positions of the control lever 68 with reference to the side on which they appear relative to the neutral position. It is immaterial mechanically and functionally whether the output shaft 31 of the motor operates clockwise or counterclockwise.

If it is desired or necessary that the prime mover and thus the input shaft of the pump be operated in a counterclockwise direction while the machinery to be operated by the output shaft 31 is to operate in a clockwise direction or counterclockwise direction, no mechanical change need be made to the variable speed unit except to reverse the indicators for the control lever and substitute an auxiliary pump in which the flow of fluid will be from the sump to the manifolds, etc. when the pump unit operates in a counterclockwise direction.

As stated above, when the control lever 68 associated with the pump unit is adjusted, the output of the pump and thus the speed and direction of the motor may be varied maintaining the torque on the output shaft substantially constant.

In order to use a roller 27 as large as possible, considering the diameter of the cylinders 24, the liners 25 have an enlarged lower section 25a within which the rollers are located.

As shown, each roller 27 is mounted on a shaft 27a which has its bearing in the lower end 26a of the cylinder as shown in FIG. 7, the lower end 26a being diametrically slotted at 26b to receive the roller 27. In order to keep the roller 27 aligned with the cams 32, the shaft 27a is provided with extensions 27b which are located in diametrically opposite slots 25b in the liner 25, the ends 27b of the shaft 27a riding in the slots 25b as the piston reciprocates. This contact between the extensions 27b and the walls of the slot 25b serves to assist in absorbing side thrusts on the cylinders applied to the rollers 27 by engagement with the cams 32.

It will be noted that the ports leading from the manifold to the valve chamber open into the latter at three approximately equispaced points around the circumference of the cylindrical valve whereby hydrostatic pressure on the port closing parts of the cylindrical valve by the fluid in the manifolds is substantially balanced and friction between the cylindrical valve and the wall of the valve chamber is substantially reduced.

Where in the description and in the claims the degrees of angles is given, it should be understood that these are approximate angles and that they may be varied considerably without substantially changing the results.

Variations and modifications may be made within the scope of the claims and portions of the improvements may be used without others.

We claim:

1. A fluid displacement device comprising a plurality of cylinders and pistons, and means for operating the pistons, the cylinders being divided into two groups and each having a plurality of pistons, the operating means for the piston of each cylinder of one group being arranged so that when each piston reaches the peak of its stroke it is operatively angularly offset from a piston of one of the cylinders of the other group by an angle which is the result of the formula:

$$X = \frac{360°}{2N}$$

wherein N is the total number of pistons and X is the angle of offset.

2. A fluid displacement device as defined in claim 1, in which the cylinders of each group are arranged in line and the two groups are displaced angularly to make a V formation, the angle of the V formation being the result of the formula:

$$Y = \frac{5 \times 360°}{2N}$$

wherein N is the total number of pistons, 5 is a factor, and Y is the angle of the V formation.

3. A fluid displacement device as defined in claim 1 in which the device comprises two sets of cylinders and pistons, each set forming a straight row and one set being angularly offset relative to the other set; a shaft having its axis intersected by the axes of all the pistons and cylinders; and a plurality of cams on said shaft angularly offset, each cam being operatively engaged with a piston in one set and also an adjacent companion piston in the other set.

4. A fluid displacement device comprising two sets of five cylinders and pistons, each set forming a straight row and one set being angularly offset 90° relative to the other set; a shaft having its axis intersected by the axes of all the pistons and cylinders; and five cams on said shaft angularly offset 72°, each cam being operatively engaged with a piston in one set and also an adjacent companion piston in the other set.

5. A fluid displacement device comprising two sets of five cylinders and pistons, each set forming a straight row and one set being angularly offset 90° relative to the other set; a shaft having its axis intersected by the axes of all the pistons and cylinders; and five cams on said shaft angularly offset 72°, each cam being operatively engaged with a piston in one set and also an adjacent companion piston in the other set, the pistons of each cylinder of one set when it reaches the peak of its stroke being operatively angularly offset from the piston of a cylinder of the other set by an angle of 18°.

6. A variable speed device comprising a fluid pump and a fluid motor, each being a substantial duplicate of the other and each of which comprises two sets of cylinders and pistons, each set forming a straight row and one set being angularly offset relative to the other set in V-formation, each pair of sets having a shaft having its axis intersected by the axes of all the pistons and cylinders of that pair; means on said shaft operatively engaging each piston; the motor and pump each having a cylinder block frame supporting its shaft, each frame having an open side; and fastening means for securing the open sides of the motor and pump frames together in edge-to-edge contact to form a casing wherein the shafts of the motor and pump are disposed in spaced parallel relation and the cylinders of the motor and pump extend outwardly and divergently in opposite directions from the casings and form an X-formation.

7. A variable speed device comprising a fluid pump and a fluid motor, each being a substantial duplicate of the other and each of which comprises two sets of five cylinders and pistons, each set forming a straight row and one set being angularly offset 90° relative to the other set in V-formation, each pair of sets having a shaft having its axis intersected by the axes of all the pistons and cylinders of that pair; each shaft having five cams angularly offset 72° and each cam being operatively engaged with a piston in one set and also an adjacent companion piston in the other set; the motor and pump each having a cylinder block frame supporting its shaft, each frame having an open side; and fastening means for securing the open sides of the motor and pump frames together in edge-to-edge contact to form a casing wherein the cam shafts of the motor and pump are disposed in spaced parallel relation and the cylinders of the motor and pump extend outwardly and divergently in opposite directions from the casings and form an X-formation.

8. A variable speed transmission comprising a pump unit and a motor unit, each unit having a power transmitting shaft and a frame open at one side and closed at both ends which form bearings for said shaft, and fastening means for securing said frame together with the open sides in direct engagement to jointly form a case constituting a sump or reservoir for the fluid medium used for transferring power of the pump to the motor.

9. The variable speed transmission as defined in claim 8, in which each unit has a supply manifold and a discharge manifold and there are conduits connecting like manifolds in the two units together, and conduits connecting the manifolds to the portion of the case forming the sump.

10. A variable speed transmission having a pump unit having a plurality of cylinders; pistons in the cylinders; a power input shaft; means on the shaft for driving the pistons seriatim invariably to their full strokes in each complete rotation of the shaft; a fluid motor unit having an output shaft, said motor unit having an invariable displacement during each cycle of operations; inlet and outlet manifolds interconnecting the pump and the motor units; and means for varying the speed of the output shaft without varying the speed of the input shaft of the pump unit comprising valve means in the pump unit operated by and coordinately with the power input shaft, said last-named means comprising means for changing the phase relation between the valve means and the input shaft whereby during each full stroke of the pistons more or less of the fluid displaced by the pistons of the pump unit is fed to the respective manifolds, the net amount of fluid displaced being fed to and discharged from the motor unit by the manifolds.

11. A variable volume fluid pump having a plurality of pistons and cylinders; means for operating said pistons seriatim invariably for their full strokes in both directions in each cycle of operation of the operating means, said operating means including power transmitting means; a first manifold and a second manifold adapted to be connected to said cylinders; valve operating means operated by said piston operating means to cause the valve means in one phase relation therewith to connect each cylinder to said first manifold and to said second manifold alternately during the entire intake stroke and the entire discharge stroke respectively of its piston; and adjustable means for controlling the phase relation between said valve operating means and said piston operating means to cause the valve to connect each cylinder to said first manifold and to said second manifold alternately during parts only of both strokes of its piston whereby the volume of fluid output of the pump may be varied without changing the speed of the means for operating the pistons.

12. A variable volume fluid pump according to claim 11, in which the means for controlling the phase relation of the valve means with the piston operating means is adjustable to cause the valve means to connect each cylinder to said first manifold and to said second manifold alternately for one-half of both strokes of its piston, whereby the fluid output of the pump may be reduced to nil without altering the speed of the means for operating the pistons.

13. A variable volume fluid pump according to claim 11, in which the means for controlling the phase relation of the valve means with the piston operating means is adjustable to cause the valve means to connect each cylinder to said first manifold and to said second manifold alternately during the discharge stroke and the intake stroke respectively of its piston, whereby the direction of output fluid flow in said manifolds may be reversed without reversing the direction of the means for operating the pistons.

14. A variable volume fluid pump according to claim 13, in which the means for controlling the phase relation of the valve means with the piston operating means is universally adjustable to cause the output flow of fluid to be gradually varied from nil to maximum in each direction of flow.

15. A variable volume fluid pump as defined in claim 11, in which there is a cylindrical valve chamber having ports leading from the cylinders and ports leading from the manifolds; and a cylindrical valve in the valve chamber rotated by said power transmitting means and having parts closing said ports and having passages to connect the ports leading from the cylinders with the ports leading from the manifolds.

16. A fluid displacement device comprising two sets of cylinders and pistons, each set forming a straight row and one set being angularly offset from the other in V-formation; a base supporting all of said cylinders; a piston-operating cam shaft supported by the base and intersected by the axes of said cylinders, said base including a valve housing located in the angle of said V-formation between the sets of cylinders, said valve housing having a valve chamber common to all of said cylinders; a rotatable cylindrical valve supported in said valve chamber; exhaust and intake manifolds secured to the valve chamber, the valve chamber having ports leading into said manifolds and ports leading to said cylinders and said rotatable cylindrical valve having passages adapted to communicate with the ports leading to the manifolds and with the ports leading to the cylinders, said passages being located in said cylindrical valve to sequentially control the flow of fluid between the manifolds and the cylinders; and means for rotating the cylindrical valve coordinately with said cam shaft.

17. The fluid displacement device as defined in claim 16, in which the ports leading from the manifold to the valve chamber open into the latter at three approximately equispaced points around the circumference of the cylindrical valve, whereby hydrostatic pressure on the port closing parts of the cylinder valve by the fluid in the manifolds is substantially balanced and friction between the cylindrical valve and the wall of the valve chamber is substantially reduced.

18. A fluid displacement device as defined in claim 16, in which there are five cylinders and pistons in each row and the rows are angularly offset 90° for the purpose described.

References Cited in the file of this patent

UNITED STATES PATENTS

| | | |
|---|---|---|
| 1,055,553 | Pearson | Mar. 11, 1913 |
| 1,146,365 | Stewart | July 13, 1915 |
| 1,382,336 | Behr | June 21, 1921 |
| 1,775,635 | Ball | Sept. 16, 1930 |
| 1,904,496 | Maw | Apr. 18, 1933 |
| 1,962,836 | Peterson | June 12, 1934 |
| 1,998,004 | Ernst | Apr. 16, 1935 |
| 2,696,788 | Funston | Dec. 14, 1954 |
| 2,709,422 | Bray | Mar. 31, 1955 |